US012737876B2

(12) United States Patent
Isei et al.

(10) Patent No.: US 12,737,876 B2
(45) Date of Patent: Sep. 15, 2026

(54) CRANKSHAFT SHAPE INSPECTION METHOD, ARITHMETIC UNIT, PROGRAM, AND SHAPE INSPECTION APPARATUS

(71) Applicant: NIPPON STEEL CORPORATION, Tokyo (JP)

(72) Inventors: Yoshito Isei, Tokyo (JP); Kousuke Sakai, Tokyo (JP); Shinya Ikeda, Tokyo (JP); Yuki Usutani, Tokyo (JP)

(73) Assignee: NIPPON STEEL CORPORATION, Tokyo (JP)

( * ) Notice: Subject to any disclaimer, the term of this patent is extended or adjusted under 35 U.S.C. 154(b) by 277 days.

(21) Appl. No.: 18/277,361

(22) PCT Filed: Apr. 22, 2021

(86) PCT No.: PCT/JP2021/016291
§ 371 (c)(1),
(2) Date: Aug. 15, 2023

(87) PCT Pub. No.: WO2022/224403
PCT Pub. Date: Oct. 27, 2022

(65) Prior Publication Data
US 2024/0046447 A1 Feb. 8, 2024

(51) Int. Cl.
*G06T 7/00* (2017.01)
*G01B 11/24* (2006.01)
*G01M 13/02* (2019.01)

(52) U.S. Cl.
CPC .............. *G06T 7/001* (2013.01); *G01B 11/24* (2013.01); *G01M 13/02* (2013.01); *G06T 2200/04* (2013.01); *G06T 2207/30164* (2013.01)

(58) Field of Classification Search
CPC ................. G06T 7/001; G06T 2200/04; G06T 2207/30164; G01B 11/24; G01B 11/245; G01B 11/2518; G01B 5/003; G01M 13/02
(Continued)

(56) References Cited

U.S. PATENT DOCUMENTS

2010/0179675 A1 7/2010 Yoshimoto
2010/0259608 A1 10/2010 Knuuttila
(Continued)

FOREIGN PATENT DOCUMENTS

CN 105467927 A 4/2016
CN 109773589 A 5/2019
(Continued)

OTHER PUBLICATIONS

Remanufacturing System with Chatter Suppression for CNC Turning, by Miadlicki et al., Sensors (Basel, Switzerland), 20(18), 5070, Sep. 7, 2020 (Year: 2020).*

*Primary Examiner* — Jennifer Mehmood
*Assistant Examiner* — Heath E. Wells
(74) *Attorney, Agent, or Firm* — Birch, Stewart, Kolasch & Birch, LLP

(57) ABSTRACT

A crankshaft shape inspection method includes: acquiring three-dimensional point cloud data of a surface of a crankshaft S; superposing the three-dimensional point cloud data on a surface shape model of the crankshaft S; moving the three-dimensional point cloud data superposed on the surface shape model to match with a coordinate system used when the crankshaft S is machined; generating an estimated machined surface, which is the surface after machining of a predetermined machining portion of the crankshaft S, in the coordinate system used when the crankshaft S is machined; and calculating a distance between machining portion point
(Continued)

cloud data extracted from the three-dimensional point cloud data moved and the estimated machined surface generated and determining a machining stock of the crankshaft S to be insufficient based on the calculated distance.

7 Claims, 12 Drawing Sheets

(58) Field of Classification Search
USPC .......................................................... 382/152
See application file for complete search history.

(56) References Cited

U.S. PATENT DOCUMENTS

| | | | | |
|---|---|---|---|---|
| 2017/0241773 | A1* | 8/2017 | Nishiwaki | G01B 11/2408 |
| 2018/0172436 | A1* | 6/2018 | Isei | G01B 5/003 |
| 2019/0128663 | A1* | 5/2019 | Isei | G01B 21/02 |
| 2021/0150695 | A1* | 5/2021 | Yogo | G01B 11/25 |

FOREIGN PATENT DOCUMENTS

| | | | |
|---|---|---|---|
| EP | 2 184 595 | A1 | 5/2010 |
| EP | 3 306 265 | A1 | 4/2018 |
| EP | 3 431 920 | A1 | 1/2019 |
| JP | 59-184814 | A | 10/1984 |
| JP | 6-265334 | A | 9/1994 |
| JP | 10-62144 | A | 3/1998 |
| JP | 2007-212357 | A | 8/2007 |
| WO | WO 2009/016988 | A1 | 2/2009 |
| WO | WO 2016/194728 | A1 | 12/2016 |
| WO | WO 2017/159626 | A1 | 9/2017 |

* cited by examiner

F I G. 2B
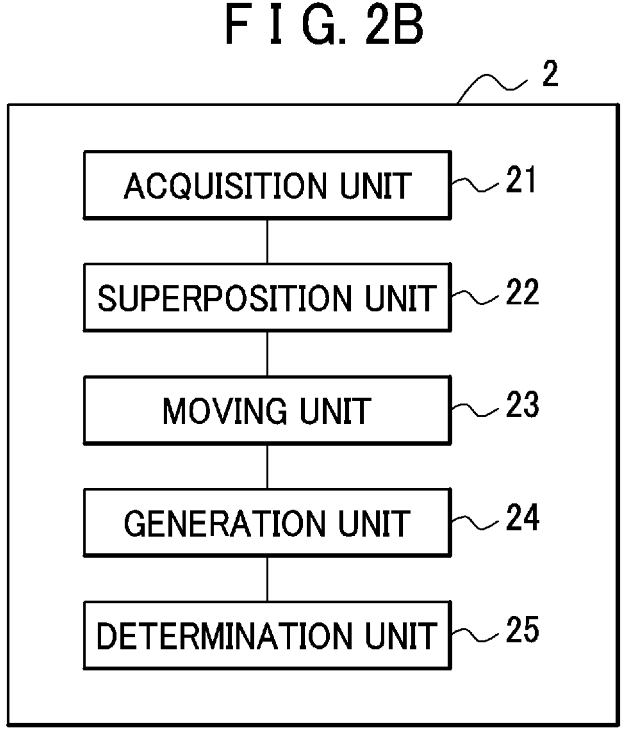
F I G. 2C
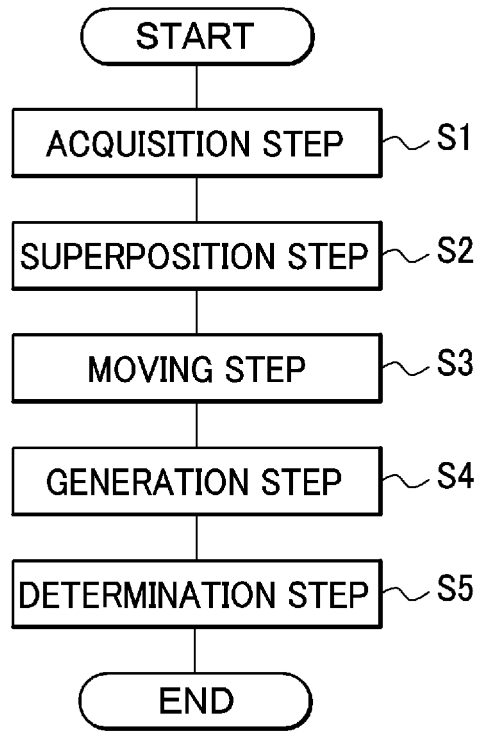

F I G. 3A
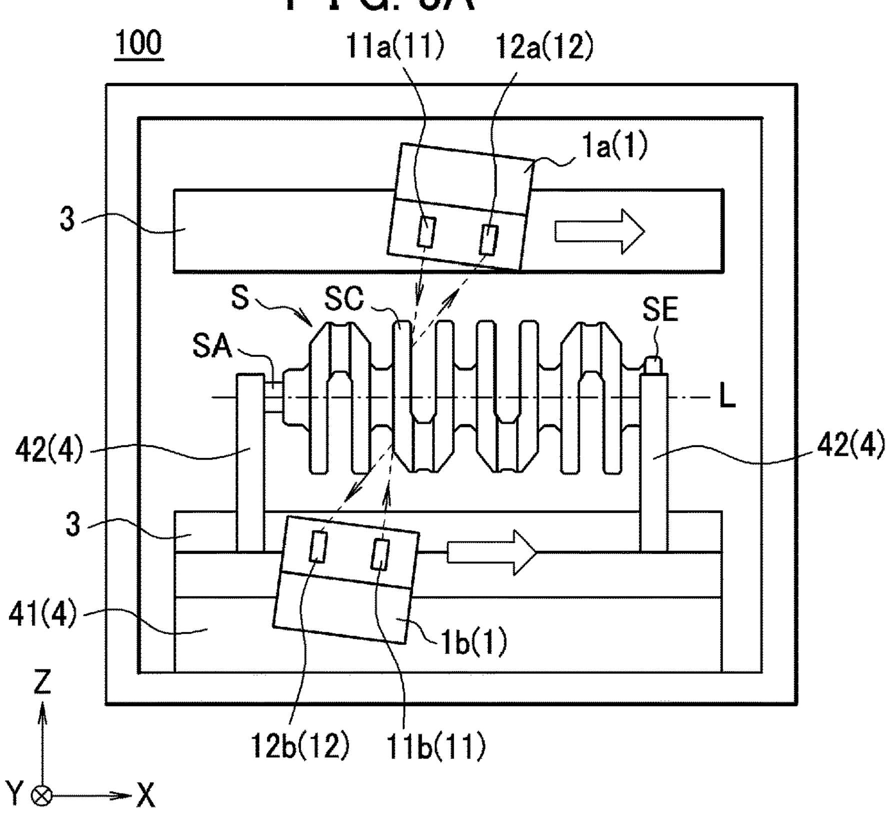
F I G. 3B
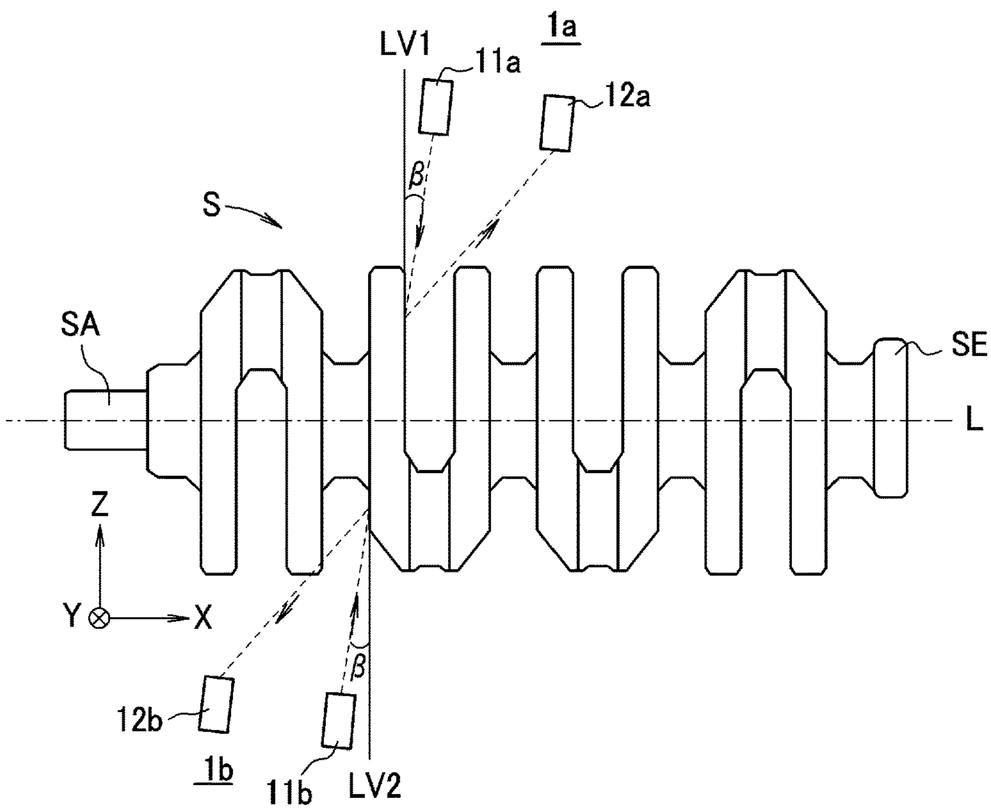

F I G. 4
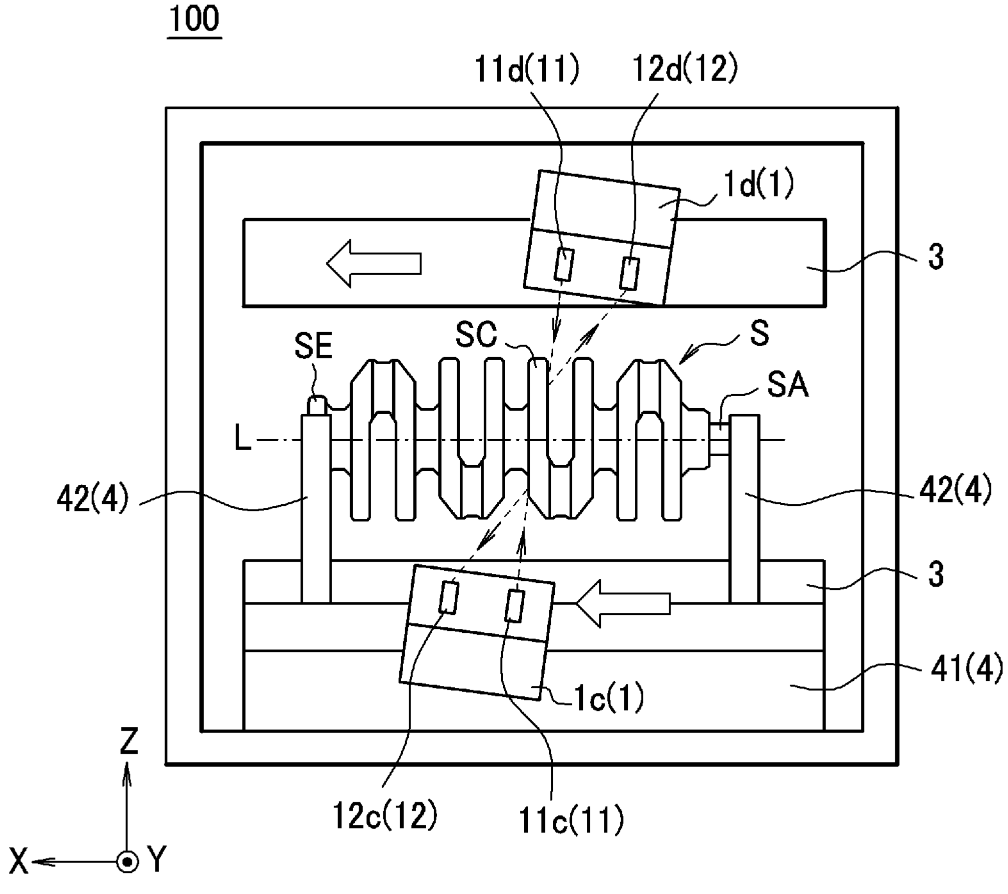

F I G. 11
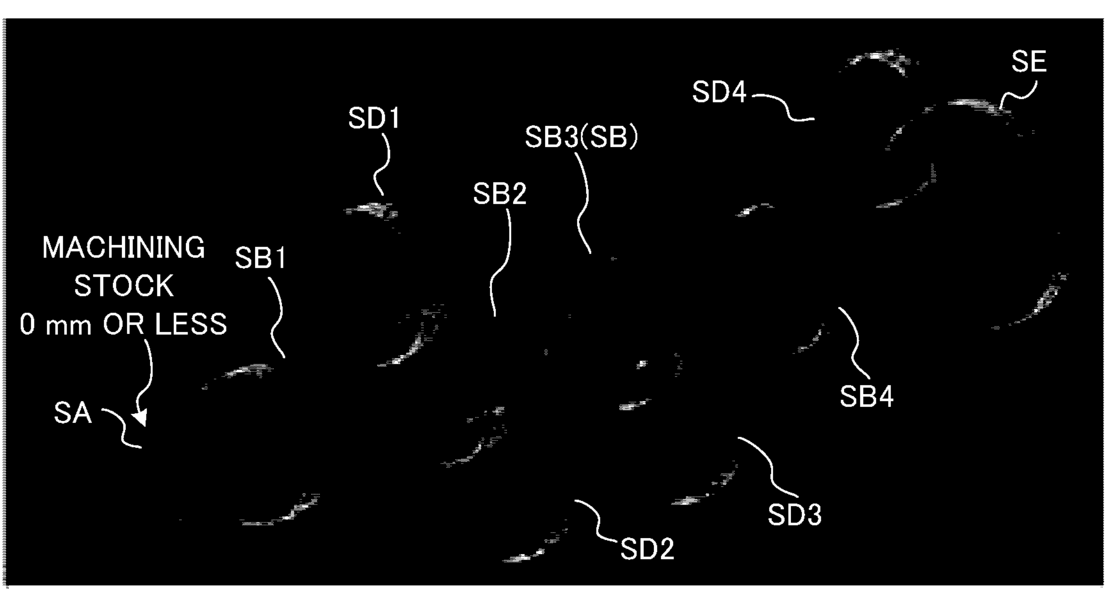

CRANKSHAFT SHAPE INSPECTION METHOD, ARITHMETIC UNIT, PROGRAM, AND SHAPE INSPECTION APPARATUS

TECHNICAL FIELD

The present invention relates to a crankshaft shape inspection method, an arithmetic unit, a program, and a shape inspection apparatus that inspect the shape of a crankshaft used in automobile engines, and the like.

BACKGROUND ART

FIG. 1A and FIG. 1B each are a view schematically illustrating one example of a crankshaft (crankshaft for inline four-cylinder engine). FIG. 1A is a front view of a crankshaft S viewed from the direction of a rotation center axis L, and FIG. 1B is a side view of the crankshaft S viewed from the direction orthogonal to the rotation center axis L.

As illustrated in FIG. 1A and FIG. 1B, the crankshaft S includes a front SA provided on the rotation center axis L of the crankshaft S, a plurality of journals SB provided on the rotation center axis L (in the example illustrated in FIG. 1A and FIG. 1B, a first journal SB1 to a fifth journal SB5), a plurality of counterweights SC for balancing the rotation provided on the rotation center axis L (in the example illustrated in FIG. 1A and FIG. 1B, a first counterweight SC1 to an eighth counterweight SC8), a plurality of pins SD for attaching connecting rods (not illustrated) each provided at a predetermined angular position around the rotation center axis L (in the example illustrated in FIG. 1A and FIG. 1B, a first pin SD1 to a fourth pin SD4), and a flange SE provided on the rotation center axis L. The cross-sectional shape of the pin SD is a circular shape centered at a position away from the rotation center axis L, and the cross-sectional shapes of the front SA, the journals SB, and the flange SE, which are shaft portions of the crankshaft S corresponding to shaft parts of an engine, are a circular shape centered on the rotation center axis L of the crankshaft S. The cross-sectional shape of the counterweight. SC is a symmetrical complex shape.

The crankshaft S illustrated in FIG. 1A and FIG. 1B is manufactured as follows: a heated material is pressed with upper and lower dies to be subjected to die forging, and thereby a forged product including flash is formed, the flash are removed, and the forged product is subjected to shot blasting. The crankshaft S manufactured through these manufacturing processes is machined by cutting so as to be incorporated appropriately when incorporated into an automobile engine or another part. Specifically, the shaft portions (the front SA, the journals SB, and the flange SE) and the pins SD of the crankshaft S are machined to have a cylindrical shape. These shaft portions and pins SD are each provided with a machining stock of about several millimeters to enable machining.

As above, since the crankshaft has a complex shape, during forging, variations in material dimensions, unevenness of a material temperature, variations in forging operations, or the like sometimes causes a defect called underfill in which the material does not fill up to the edge of the die, or a bend or a twist over the entire length of the crankshaft. Further, a dent flaw is also caused in some cases when the crankshaft comes into contact with conveyance equipment or another object during handling. Furthermore, the shaft portions and the pins, which are machining portions of the crankshaft, do not have a sufficient machining stock in some cases. For this reason, in the manufacturing process of the crankshaft, before machining, the actual shape of the crankshaft is inspected by comparing it with a reference shape to determine whether the crankshaft is accepted or rejected.

Criteria for determining whether the crankshaft is accepted or rejected include the following: (a) a bend and a twist of the crankshaft must be within a predetermined allowable range, (b) the counterweight must have no underfill or dent flaw that exceeds an allowable range, and (c) the shaft portion and the pin, which are machining portions, must have a predetermined machining stock.

The above (a) and (b) are set as conditions necessary for achieving the dimensional accuracy and weight balance of the crankshaft as a final product. This is because if the crankshaft is bent or twisted so much that the installation position of the pin deviates from a predetermined angle greatly, it will be difficult to achieve the dimensional accuracy and weight balance of the crankshaft as a final product, no matter what machining is performed in the subsequent processes. Further, this is because also in the case where the shape of the counterweight is not as designed and the center of gravity shifts due to the underfill or dent flaw, it will be similarly difficult to achieve the weight balance of the crankshaft as a final product.

The above (c) is set as a condition necessary for machining. This is because no matter how well the weight balance of the crankshaft is achieved, if there is no sufficient machining stock, it is difficult to achieve the dimensional accuracy after machining, and further, the forged surface with poor surface properties remains, failing to use the crankshaft as an engine component.

Specifically, acceptance or rejection of the bend of the crankshaft is determined as follows: the amounts of deviation of the shaft portions (the front, the journals, and the flange) from the rotation center axis when the crankshaft is adjusted to a coordinate system (XYZ coordinate system in FIG. 1A and FIG. 1B) at the time of machining are used as a management index, and the acceptance or rejection is determined by whether or not this management index is within a tolerance (for example, within ±1 mm). Further, acceptance or rejection of the twist of the crankshaft is determined as follows: a division angle of the pin is used as a management index, and the acceptance or rejection is determined by whether or not this management index is within a specification (for example, within ±1°).

Further, acceptance or rejection of the shape of the counterweight is determined using side dimensions (width, height, outer diameter) of the counterweight viewed from the direction of the rotation center axis of the crankshaft as illustrated in FIG. 1A as a management index. This management index is necessary to ensure the rotational balance of the crankshaft. Further, regarding the acceptance or rejection of the shape of the counterweight, the longitudinal positions of the counterweight viewed from the direction orthogonal to the rotation center axis of the crankshaft as illustrated in FIG. 1B are also used as a management index. This management index is necessary to detect the thickness (dimension along the rotation axis direction) or tilt of the counterweight. Each tolerance is determined for the above-described management indexes relating to the shape of the counterweight (for example, ±1 mm, ±2 mm).

Further, regarding the acceptance or rejection of the shape of the shaft portion, a forging thickness and forging die mismatch that enable a grasp of the accuracy of die forging are used as a management index in the manufacturing process.

A conventional method to inspect the crankshaft is as follows: templates formed to match with reference shapes of the pin and the counterweight are each put on the pin and the counterweight of the crankshaft to be inspected, to measure the gap between the template and the pin and the gap between the template and the counterweight with a scale, and if the dimensions of the gaps (shape errors) are each in an allowable range, the crankshaft is determined as acceptance. This method is performed manually by an operator using the templates formed to match with the reference shapes of the pin and the counterweight, thus not only causing individual differences in inspection accuracy, but also requiring a long time for inspection. Therefore, various crankshaft shape inspection methods have been proposed as described in Patent Literatures 1 to 6 in order to perform automatic and accurate inspections.

CITATION LIST

Patent Literature

Patent Literature 1: Japanese Laid-open Patent Publication No. 59-184814
Patent Literature 2: Japanese Laid-open Patent Publication No. 06-265334
Patent Literature 3: Japanese Laid-open Patent Publication No. 10-62144
Patent Literature 4: Japanese Laid-open Patent Publication No. 2007-212357
Patent Literature 5: International Publication Pamphlet No. WO2016/194728
Patent Literature 6: International Publication Pamphlet No. WO2017/159626

SUMMARY OF INVENTION

Technical Problem

The conventional shape inspection methods have not been proposed to make it possible to determine the machining stock required for machining of the crankshaft to be insufficient.

The present invention has been made in order to solve the problems of the conventional techniques described above, and an object thereof is to make it possible to determine the machining stock required for machining of a crankshaft to be insufficient.

Solution to Problem

The crankshaft shape inspection method of the present invention includes:

a first step that acquires three-dimensional point cloud data of a surface of a crankshaft by a three-dimensional shape measuring device measuring a surface shape of the crankshaft;

a second step that superposes the three-dimensional point cloud data acquired at the first step on a surface shape model of the crankshaft prepared in advance based on design specifications of the crankshaft;

a third step that moves the three-dimensional point cloud data superposed on the surface shape model at the second step to match with a coordinate system used when the crankshaft is machined;

a fourth step that generates an estimated machined surface, which is the surface after machining of a predetermined machining portion of the crankshaft, in the coordinate system used when the crankshaft is machined; and a fifth step that extracts from the three-dimensional point cloud data moved at the third step, machining portion point cloud data, which are point cloud data of the machining portion, calculates a distance between the extracted machining portion point cloud data and the estimated machined surface generated at the fourth step, and determines a machining stock of the crankshaft to be insufficient based on the calculated distance.

The arithmetic unit of the present invention being an arithmetic unit intended for inspecting a shape of a crankshaft, the arithmetic unit includes:

an acquisition means that acquires three-dimensional point cloud data of a surface of the crankshaft based on a result obtained by a three-dimensional shape measuring device measuring a surface shape of the crankshaft;

a superposition means that superposes the three-dimensional point cloud data acquired by the acquisition means on a surface shape model of the crankshaft prepared in advance based on design specifications of the crankshaft;

a moving means that moves the three-dimensional point cloud data superposed on the surface shape model by the superposition means to match with a coordinate system used when the crankshaft is machined;

a generation means that generates an estimated machined surface, which is the surface after machining of a predetermined machining portion of the crankshaft, in the coordinate system used when the crankshaft is machined; and a determination means that extracts from the three-dimensional point cloud data moved by the moving means, machining portion point cloud data, which are point cloud data of the machining portion, calculates a distance between the extracted machining portion point cloud data and the estimated machined surface generated by the generation means, and determines a machining stock of the crankshaft to be insufficient based on the calculated distance.

The program of the present invention being a program intended for inspecting a shape of a crankshaft, the program causes a computer to execute:

an acquisition means that acquires three-dimensional point cloud data of a surface of the crankshaft based on a result obtained by a three-dimensional shape measuring device measuring a surface shape of the crankshaft;

a superposition means that superposes the three-dimensional point cloud data acquired by the acquisition means on a surface shape model of the crankshaft prepared in advance based on design specifications of the crankshaft;

a moving means that moves the three-dimensional point cloud data superposed on the surface shape model by the superposition means to match with a coordinate system used when the crankshaft is machined;

a generation means that generates an estimated machined surface, which is the surface after machining of a predetermined machining portion of the crankshaft, in the coordinate system used when the crankshaft is machined; and a determination means that extracts from the three-dimensional point cloud data moved by the moving means, machining portion point cloud data, which are point cloud data of the machining portion, calculates a distance between the extracted machining portion point cloud data and the estimated machined surface generated by the generation means, and determines a machining stock of the crankshaft to be insufficient based on the calculated distance.

The crankshaft shape inspection apparatus of the present invention includes:

four or more optical three-dimensional shape measuring devices that are arranged around a rotation center axis of a crankshaft, and measure a three-dimensional shape of the crankshaft by projecting and receiving light on and from the crankshaft while relatively moving in a direction parallel to the rotation center axis of the crankshaft; and an arithmetic unit that receives measurement results obtained by the four or more three-dimensional shape measuring devices and executes a predetermined arithmetic operation, in which the three-dimensional shape measuring devices are divided into first-group shape measuring devices and second-group shape measuring devices, the first-group shape measuring devices that have light projection directions thereof inclined in the same direction with respect to a direction orthogonal to the rotation center axis of the crankshaft and the second-group shape measuring devices that have light projection directions thereof inclined in a direction different from the direction of the first-group shape measuring devices, the second-group shape measuring devices are arranged around the rotation center axis of the crankshaft between the first-group shape measuring devices, and in the arithmetic unit, a surface shape model of the crankshaft, which is created based on design specifications of the crankshaft, is stored in advance, the arithmetic unit includes:

an acquisition means that acquires three-dimensional point cloud data of a surface of the crankshaft based on results obtained by the three-dimensional shape measuring devices measuring a surface shape of the crankshaft;

a superposition means that superposes the three-dimensional point cloud data acquired by the acquisition means on the surface shape model;

a moving means that moves the three-dimensional point cloud data superposed on the surface shape model by the superposition means to match with a coordinate system used when the crankshaft is machined;

a generation means that generates an estimated machined surface, which is the surface after machining of a predetermined machining portion of the crankshaft, in the coordinate system used when the crankshaft is machined; and a determination means that extracts from the three-dimensional point cloud data moved by the moving means, machining portion point cloud data, which are point cloud data of the machining portion, calculates a distance between the extracted machining portion point cloud data and the estimated machined surface generated by the generation means, and determines a machining stock of the crankshaft to be insufficient based on the calculated distance.

Advantageous Effects of Invention

According to the present invention, it is possible to determine the machining stock required for machining of a crankshaft to be insufficient.

BRIEF DESCRIPTION OF DRAWINGS

FIG. 2B is a diagram illustrating a functional configuration of an arithmetic unit according to the embodiment.

FIG. 2C is a flowchart illustrating pieces of processing to be executed by the arithmetic unit according to the embodiment.

FIG. 3A is a view illustrating a schematic configuration of the crankshaft shape inspection apparatus according to the embodiment.

FIG. 3B is a view illustrating a schematic configuration of the crankshaft shape inspection apparatus according to the embodiment.

FIG. 4 is a view illustrating a schematic configuration of the crankshaft shape inspection apparatus according to the embodiment.

FIG. 11 is a view illustrating a display example of a monitor included in the arithmetic unit according to the embodiment.

DESCRIPTION OF EMBODIMENTS

There will be explained one example of the present invention below with reference to the accompanying drawings appropriately.

Figure 1A:
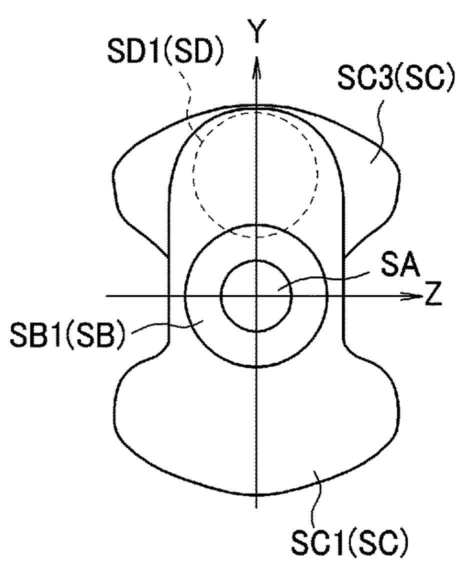
FIG. 1A is a view schematically illustrating one example of a crankshaft.
Figure 1B:
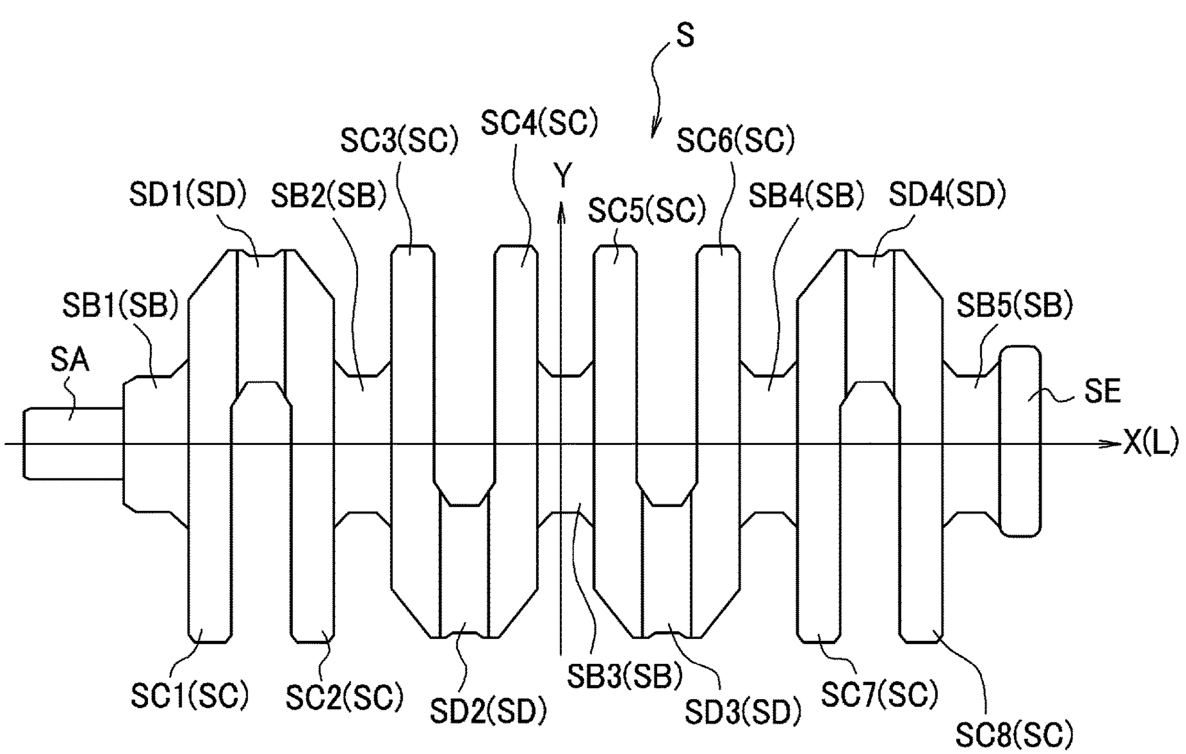
FIG. 1B is a view schematically illustrating one example of the crankshaft.
Figure 2A:
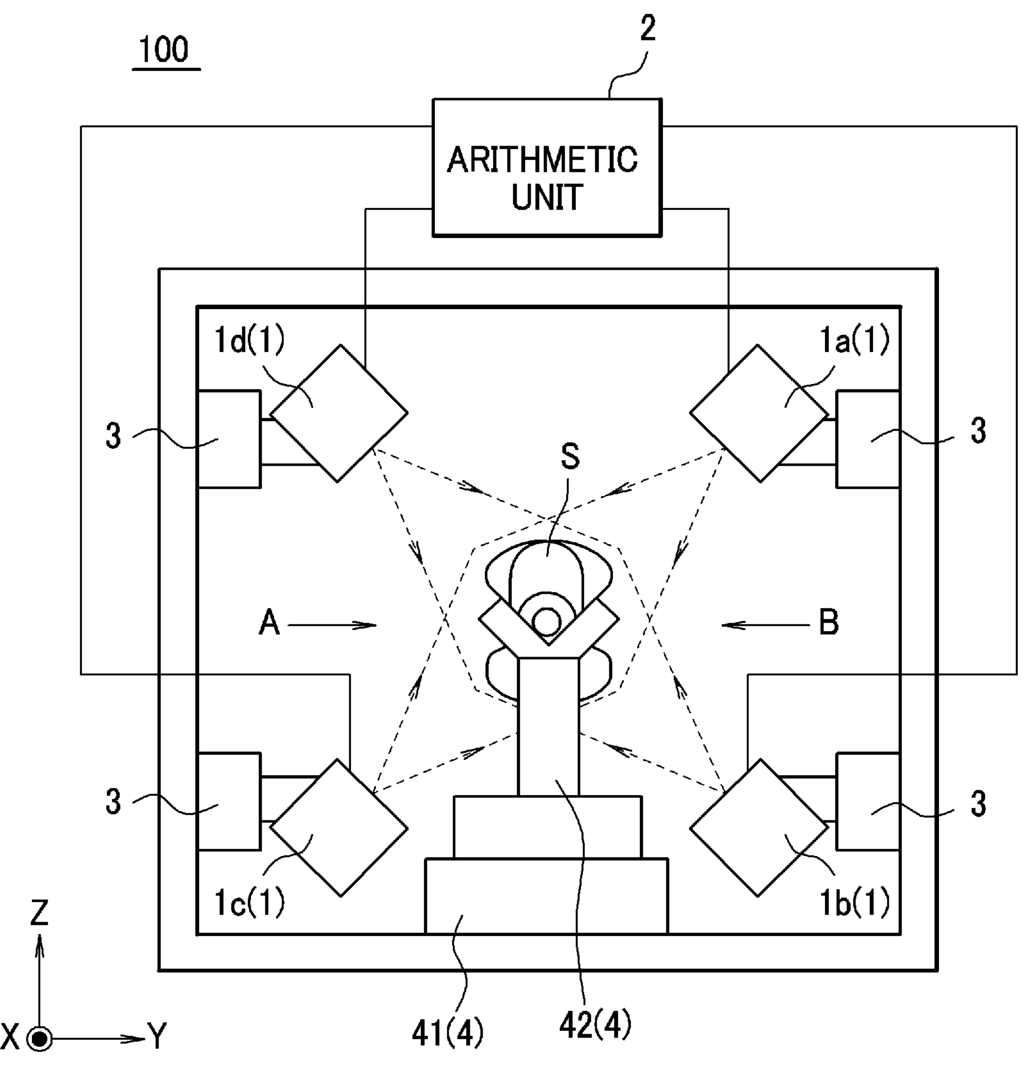
FIG. 2A is a view illustrating a schematic configuration of a crankshaft shape inspection apparatus according to an embodiment.

FIG. 2A to FIG. 4 are views illustrating a schematic configuration of a crankshaft shape inspection apparatus 100 according to an embodiment (to be simply referred to as a "shape inspection apparatus" below). FIG. 2A is a front perspective view of the shape inspection apparatus 100 viewed from the direction of a rotation center axis (X-axis direction) of a crankshaft S (crankshaft for inline four-cylinder engine). FIG. 2B is a diagram illustrating a functional configuration of an arithmetic unit 2. FIG. 2C is a flowchart illustrating pieces of processing to be executed by the arithmetic unit 2. FIG. 3A is a side view viewed from the direction indicated by an arrow A in FIG. 2A. FIG. 3B is a partial enlarged side view of FIG. 3A. FIG. 4 is a side view viewed from the direction indicated by an arrow B in FIG. 2A. Incidentally, the direction parallel to a rotation center axis L of the crankshaft S when the crankshaft S is not bent or twisted is set to an X-axis direction, the horizontal direction orthogonal to the rotation center axis L of the crankshaft S is set to a Y-axis direction, and the vertical direction orthogonal to the rotation center axis L of the crankshaft S is set to a Z-axis direction. Further, in FIG. 3A, FIG. 3B, and FIG. 4, the illustration of the arithmetic unit 2 is omitted.

As illustrated in FIG. 2A to FIG. 4, the shape inspection apparatus 100 includes optical three-dimensional shape measuring devices 1, the arithmetic unit 2, positioning devices 3, and a support device 4.

The three-dimensional shape measuring device 1 is a device that measures the three-dimensional shape of the crankshaft S by projecting and receiving light on and from the crankshaft S. Specifically, the three-dimensional shape measuring device 1 includes a light-projecting unit 11 that projects linear laser light extending in the direction orthogonal to the rotation center axis L of the crankshaft S toward the crankshaft S, and a light-receiving unit 12 that receives light reflected on the surface of the crankshaft S and captures an image, and is configured to measure the three-dimensional shape of the crankshaft S by an optical cutting method that analyzes the deformation of the linear laser light. However, in applying the present invention, the three-dimensional shape measuring device is not limited to this, and can also employ a configuration to measure the three-dimensional shape of the crankshaft S using a spatial encoding method by projecting a stripe pattern or a grid pattern.

The three-dimensional shape measuring device 1 is arranged, for example, at a position inclined by an angle β with respect to the plane orthogonal to the direction of the rotation center axis of the crankshaft S (the X-axis direction), and when the distance to the crankshaft S is 400 mm, the measurement field of view in the circumferential direction of the crankshaft S is 180 mm. Further, the measurement resolution of the crankshaft S in the circumferential direction is 0.3 mm, and the measurement resolution of the crankshaft S in the radial direction when the measurement cycle is 500 Hz is about 0.02 mm. As such a three-dimensional shape measuring device 1, for example, an ultra-high-speed in-line profilometer "LJ-V7300" manufactured by KEYENCE CORPORATION can be used. When the three-dimensional shape measuring device 1 is moved at 200 mm/sec in the X-axis direction by the later-described positioning device 3, it is possible to measure the three-dimensional shape of the crankshaft S in which the measurement resolution in the X-axis direction (the axial direction of the crankshaft S) is 0.4 mm, the measurement resolution of the crankshaft S in the circumferential direction is 0.3 mm, and the measurement resolution of the crankshaft S in the radial direction is 0.02 mm.

The shape inspection apparatus 100 includes, as the three-dimensional shape measuring device 1, four three-dimensional shape measuring devices 1*a* to 1*d* arranged around the rotation center axis L of the crankshaft S at a pitch of 90°. The three-dimensional shape measuring device 1*a* includes a light-projecting unit 11*a* and a light-receiving unit 12*a*, the three-dimensional shape measuring device 1*b* includes a light-projecting unit 11*b* and a light-receiving unit 12*b*, the three-dimensional shape measuring device 1*c* includes a light-projecting unit 11*c* and a light-receiving unit 12*c*, and the three-dimensional shape measuring device 1*d* includes a light-projecting unit 11*d* and a light-receiving unit 12*d*. The four three-dimensional shape measuring devices 1*a* to 1*d* are provided in this manner, thereby making it possible to measure the three-dimensional shape of the entire crankshaft S without rotating the crankshaft S around the rotation center axis L.

Then, among the four three-dimensional shape measuring devices 1*a* to 1*d*, the three-dimensional shape measuring devices adjacent to each other around the rotation center axis L of the crankshaft S have their light projection directions inclined in opposite directions to each other with respect to the direction orthogonal to the rotation center axis L of the crankshaft S.

For example, as illustrated in FIG. 3B, the light projection direction from the light-projecting unit 11*a* of the three-dimensional shape measuring device 1*a* is inclined by the angle β toward the flange SE side with respect to a direction LV1 orthogonal to the rotation center axis L of the crankshaft S, while the light projection direction from the light-projecting unit 11*b* of the three-dimensional shape measuring device 1*b* adjacent to the three-dimensional shape measuring device 1*a* is inclined by the angle β toward the front SA side with respect to a direction LV2 orthogonal to the rotation center axis L of the crankshaft S. As can be seen by referring to FIG. 4, the light projection direction from the light-projecting unit 11*d* of the three-dimensional shape measuring device 1*d* adjacent to the three-dimensional shape measuring device 1*a* is inclined toward the front SA side (inclined by the angle β, which is not illustrated) with respect to the direction orthogonal to the rotation center axis L of the crankshaft S, while the light projection direction from the light-projecting unit 11*c* of the three-dimensional shape measuring device 1*c* adjacent to the three-dimensional shape measuring devices 1*b* and 1*d* is inclined toward the flange SE side (inclined by the angle β, which is not illustrated) with respect to the direction orthogonal to the rotation center axis L of the crankshaft S.

As above, the light projection direction is inclined with respect to the direction orthogonal to the rotation center axis L of the crankshaft S, thereby making it possible to measure the shape of the side surface of the counterweight SC (the side surface in the direction orthogonal to the rotation center axis L of the crankshaft S). Further, the light projection directions of the adjacent three-dimensional shape measuring devices 1 are inclined in opposite directions to each other with respect to the direction orthogonal to the rotation center axis L of the crankshaft S, thus making it possible to measure the shapes of both the side surfaces (the side surface on the front SA side and the side surface of the flange SE side) of the counterweight SC. When the angle β is 5°, the measurement pitch of the side surface of the counterweight SC in the Y-axis direction is 4.5 mm (=0.4 mm/tan 5°).

The arithmetic unit 2 executes predetermined arithmetic operations on the measurement result obtained by the three-dimensional shape measuring device 1. Specifically, as illustrated in FIG. 2B, the arithmetic unit 2 includes an acquisition unit 21, a superposition unit 22, a moving unit 23, a generation unit 24, and a determination unit 25.

The acquisition unit 21 generates (acquires) three-dimensional point cloud data of the surface of the crankshaft S based on the result obtained by the three-dimensional shape measuring device 1 measuring the surface shape of the crankshaft S.

The superposition unit 22 superposes the three-dimensional point cloud data acquired by the acquisition unit 21 on a surface shape model of the crankshaft S. The surface shape model is prepared in advance based on design specifications of the crankshaft S.

The moving unit 23 moves the three-dimensional point cloud data superposed on the surface shape model by the superposition unit 22 to match with a coordinate system used when the crankshaft S is machined.

The generation unit 24 generates an estimated machined surface, which is the surface after machining of a predetermined machining portion of the crankshaft S, in the coordinate system used when the crankshaft S is machined.

The determination unit 25 extracts from the three-dimensional point cloud data moved by the moving unit 23, machining portion point cloud data, which are point cloud data of the machining portion, calculates the distance between the extracted machining portion point cloud data and the estimated machined surface generated by the generation unit 24, and determines the machining stock of the crankshaft S to be insufficient based on the calculated distance.

The arithmetic unit 2 is configured by a computer device including, for example, a CPU, a ROM, a RAM, and so on, and its functions are achieved by the CPU executing a predetermined program. Specifically, for example, by mounting a well-known point cloud processing library such as open-source "PCL (Point Cloud Library)" or "HALCON" manufactured by MVTec Software GmbH on a computer device, the arithmetic unit 2 can be configured. The above-described point cloud processing library can handle surface data (data formed of a cylinder, a plane, a triangular mesh, and the like) in addition to the point cloud data, and can execute various operations relating to point cloud data and surface data, such as pieces of preprocessing such as smoothing and thinning processing, extraction of point cloud data based on coordinates or distances, coordinate conversion, matching processing, fitting processing, dimension measurement of point cloud data, and generation of three-dimensional surfaces.

Further, the surface shape model of the crankshaft S prepared in advance based on the design specifications of the crankshaft S is stored in the arithmetic unit 2. Specifically, three-dimensional CAD data based on the design specifications are input to the arithmetic unit 2, and the arithmetic unit 2 converts the input CAD data into a surface shape model formed of a triangular mesh or the like and stores the model. The surface shape model only needs to be created and stored for each type of the crankshaft S, and thus, when the same type of the crankshaft S is continuously inspected, there is no need to create a surface shape model for each inspection.

The positioning device 3 relatively moves the three-dimensional shape measuring device 1 in the X-axis direction parallel to the rotation center axis L of the crankshaft S. As the positioning device 3, for example, a uniaxial stage can be used. As the uniaxial stage used for the positioning device 3, the one capable of performing positioning or grasping a position with a resolution of 0.1 mm or less is preferred. In this embodiment, the positioning device 3 is provided for each of the three-dimensional shape measuring devices 1 in order to move the four three-dimensional shape measuring devices 1 independently. Incidentally, although the positioning device 3 is to move the three-dimensional shape measuring device 1, it is not necessarily limited to this, and a mechanism to move the crankshaft S in the X-axis direction can also be used. The three-dimensional shape of the entire crankshaft S can be measured by projecting and receiving light on and from the crankshaft S while the three-dimensional shape measuring device 1 moving relatively in the X-axis direction.

Incidentally, if measurement positions of the four three-dimensional shape measuring devices 1*a* to 1*d* in the X-axis direction are close to each other, the lights projected from the respective three-dimensional shape measuring devices 1*a* to 1*d* may interfere with each other, causing erroneous measurements. Therefore, for example, the four positioning devices 3 move the three-dimensional shape measuring devices 1*a* to 1*d* respectively so that the three-dimensional shape measuring devices 1*a* to 1*d* are spaced about 200 mm apart in the X-axis direction.

The support device 4 includes a base 41 and a pair of support parts 42 extending from both ends of the base 41 in the Z-axis direction respectively. One of the support parts 42 supports the front SA of the crankshaft S, and the other of the support parts 42 supports the flange SE of the crankshaft S. The upper ends of the support parts 42 are V-shaped, which allows the crankshaft S to be supported in a stable posture.

Incidentally, as the three-dimensional shape measuring device 1, the positioning device, and the support device 4 included in the shape inspection apparatus 100 according to this embodiment, it is possible to employ the same configurations as those of the shape inspection apparatus, the mobile device, and the support device described in Patent Literature 6, respectively, and thus further detailed explanations are omitted here.

Further, this embodiment is designed to include the four three-dimensional shape measuring devices 1*a* to 1*d*, but five or more three-dimensional shape measuring devices may be provided to measure the three-dimensional shape of the crankshaft S.

The following explains a shape inspection method of the crankshaft S using the shape inspection apparatus 100 having the above-described configuration.

The shape inspection method according to this embodiment includes a first step to a fifth step. As illustrated in FIG. 2C, the arithmetic unit 2 executes an acquisition step, which is the first step, at Step S1, executes a superposition step, which is the second step, at Step S2, executes a moving step, which is the third step, at Step S3, executes a generation step, which is the fourth step, at Step S4, and executes a determination step, which is the fifth step, at Step S5. Each step will be explained sequentially below.

<First Step (Acquisition Step)>

At the first step, the three-dimensional shape measuring device 1 measures the surface shape of the crankshaft S, and thereby three-dimensional point cloud data of the surface of the crankshaft S are acquired.

Specifically, the crankshaft S is placed on the support device 4, and the positioning devices 3 move the four three-dimensional shape measuring devices 1*a* to 1*d* to the front SA side in the X-axis direction. Then, the three-dimensional shape of the crankshaft S is measured by projecting and receiving lights on and from the crankshaft S while the positioning devices 3 moving the four three-dimensional shape measuring devices 1*a* to 1*d* to the flange SE side in the X-axis direction. On this occasion, in order to prevent the lights projected from the respective three-dimensional shape measuring devices 1*a* to 1*d* from interfering with each other and causing erroneous measurements, for example, the positioning devices 3 move the three-dimensional shape measuring devices 1*a* to 1*d* respectively so that the three-dimensional shape measuring devices 1*a* to

1*d* are spaced about 200 mm apart in the X-axis direction. For example, when moving the three-dimensional shape measuring devices 1*a* to 1*d* at 200 mm/s, the three-dimensional shape measuring devices 1*a* to 1*d* are each moved with a delay of 1 sec. The maximum length of the crankshaft S is about 700 mm in the case where the crankshaft S is for three- to six-cylinder engines, and thus, it is possible to acquire the three-dimensional point cloud data over the entire length of the crankshaft S within 8 seconds, even if the moving distance is 800 mm.

The three-dimensional point cloud data over the entire length of the crankshaft S acquired as described above are input to and stored in the arithmetic unit 2 via Ethernet (registered trademark) or other means. The acquisition unit 21 in the arithmetic unit 2 generates (acquires) three-dimensional point cloud data of the entire surface of the crankshaft S by combining the measurement results obtained by the four three-dimensional shape measuring devices 1*a* to 1*d*.

Figure 5:
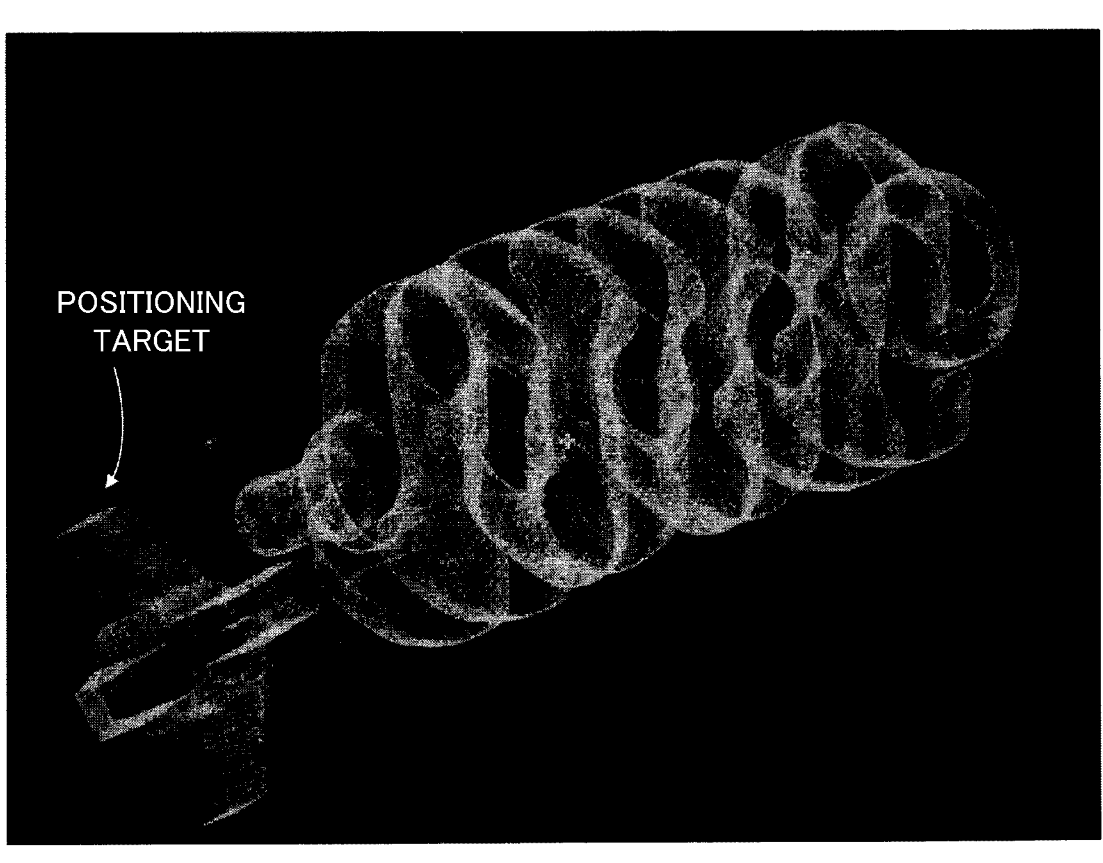
FIG. 5 is a view illustrating one example of three-dimensional point cloud data acquired at a first step of a crankshaft shape inspection method according to an embodiment.

FIG. 5 is a view illustrating one example of the three-dimensional point cloud data acquired at the first step. Incidentally, FIG. 5 also illustrates three-dimensional point cloud data of a positioning target used when combining the measurement results obtained by the four three-dimensional shape measuring devices 1*a* to 1*d* or for another purpose, and this positioning target exhibits the same function as that described in Patent Literature 6, and thus, its detailed explanation is omitted here.

<Second Step (Superposition Step)>

At the second step, the superposition unit 22 in the arithmetic unit 2 translates and rotates the three-dimensional point cloud data to make the distance between the three-dimensional point cloud data as illustrated in FIG. 5, which are acquired at the first step, and the surface shape model of the crankshaft S minimum, and superposes the three-dimensional point cloud data on the surface shape model. That is, the superposition unit 22 translates and rotates the three-dimensional point cloud data to make the sum of the distances between the respective data points constituting the three-dimensional point cloud data and the surface shape model, or the sum of the sum of the squared distances minimum, and superposes the three-dimensional point cloud data on the surface shape model.

<Third Step (Moving Step)>

At the third step, the moving unit 23 in the arithmetic unit 2 extracts from the three-dimensional point cloud data superposed on the surface shape model at the second step, machining reference portion point cloud data, which are point cloud data of a predetermined machining reference portion, and translates and rotates the three-dimensional point cloud data to make the coordinates of the machining reference determined by the aforementioned extracted machining reference portion point cloud data match with the coordinates predetermined in the coordinate system used when the crankshaft S is machined.

Figure 6A:
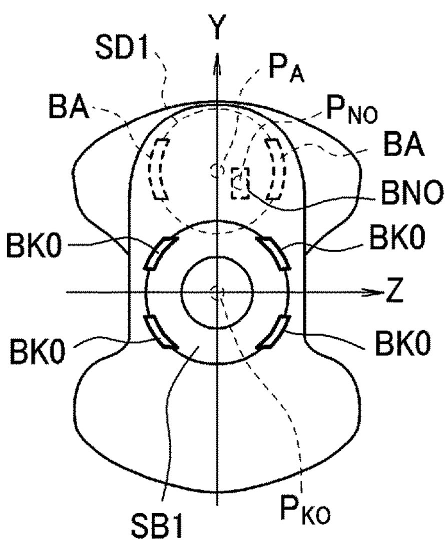
FIG. 6A is an explanatory view explaining a third step of the crankshaft shape inspection method according to the embodiment.
Figure 6B:
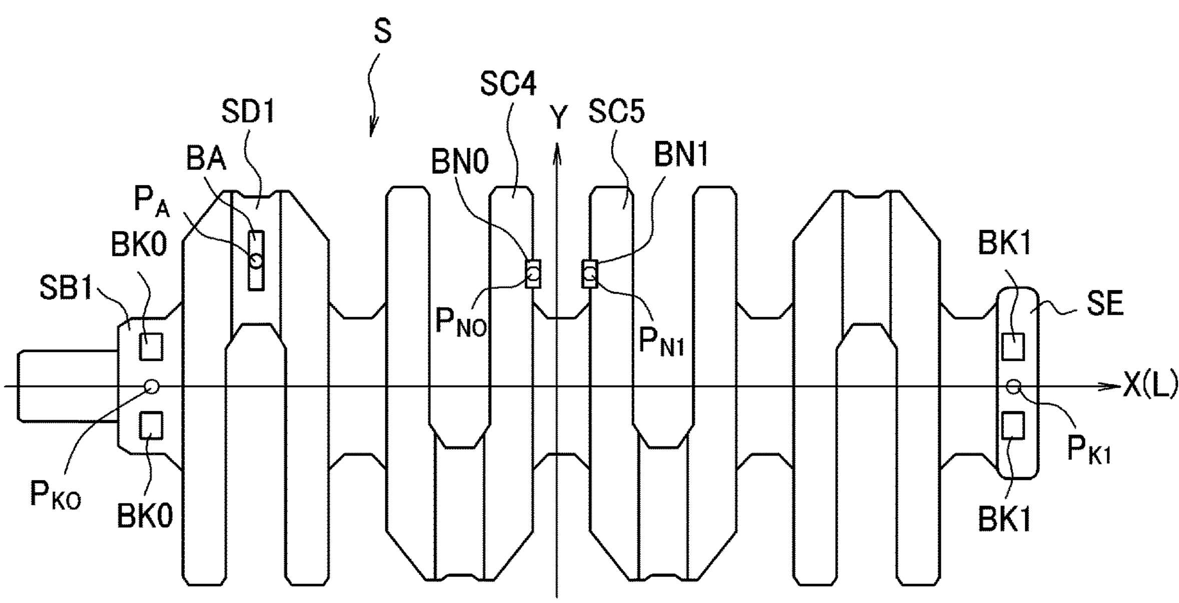
FIG. 6B is an explanatory view explaining the third step of the crankshaft shape inspection method according to the embodiment.
Figure 7A:
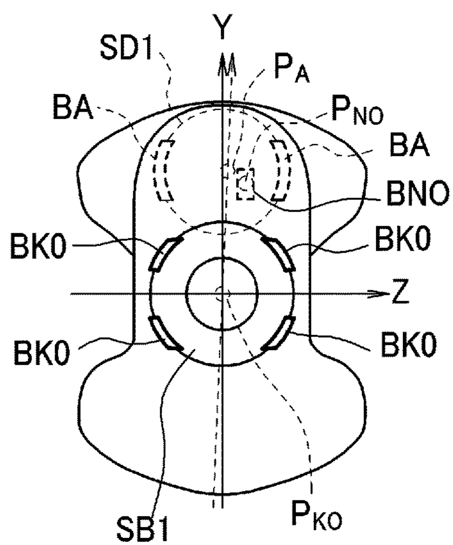
FIG. 7A is an explanatory view explaining the third step of the crankshaft shape inspection method according to the embodiment.
Figure 7B:
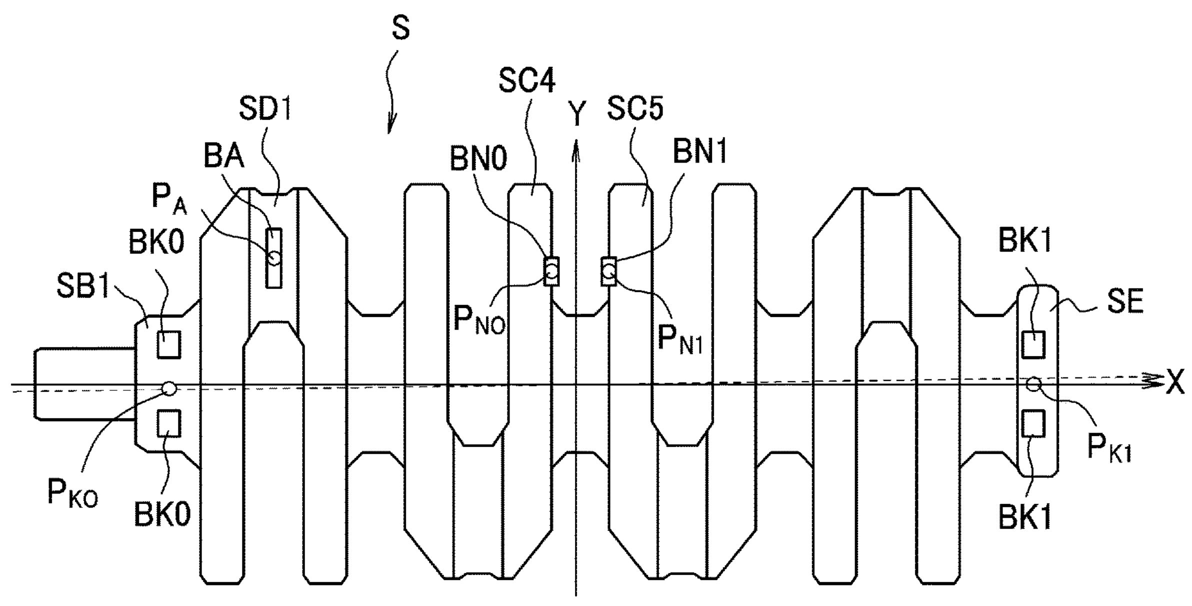
FIG. 7B is an explanatory view explaining the third step of the crankshaft shape inspection method according to the embodiment.
Figure 8:
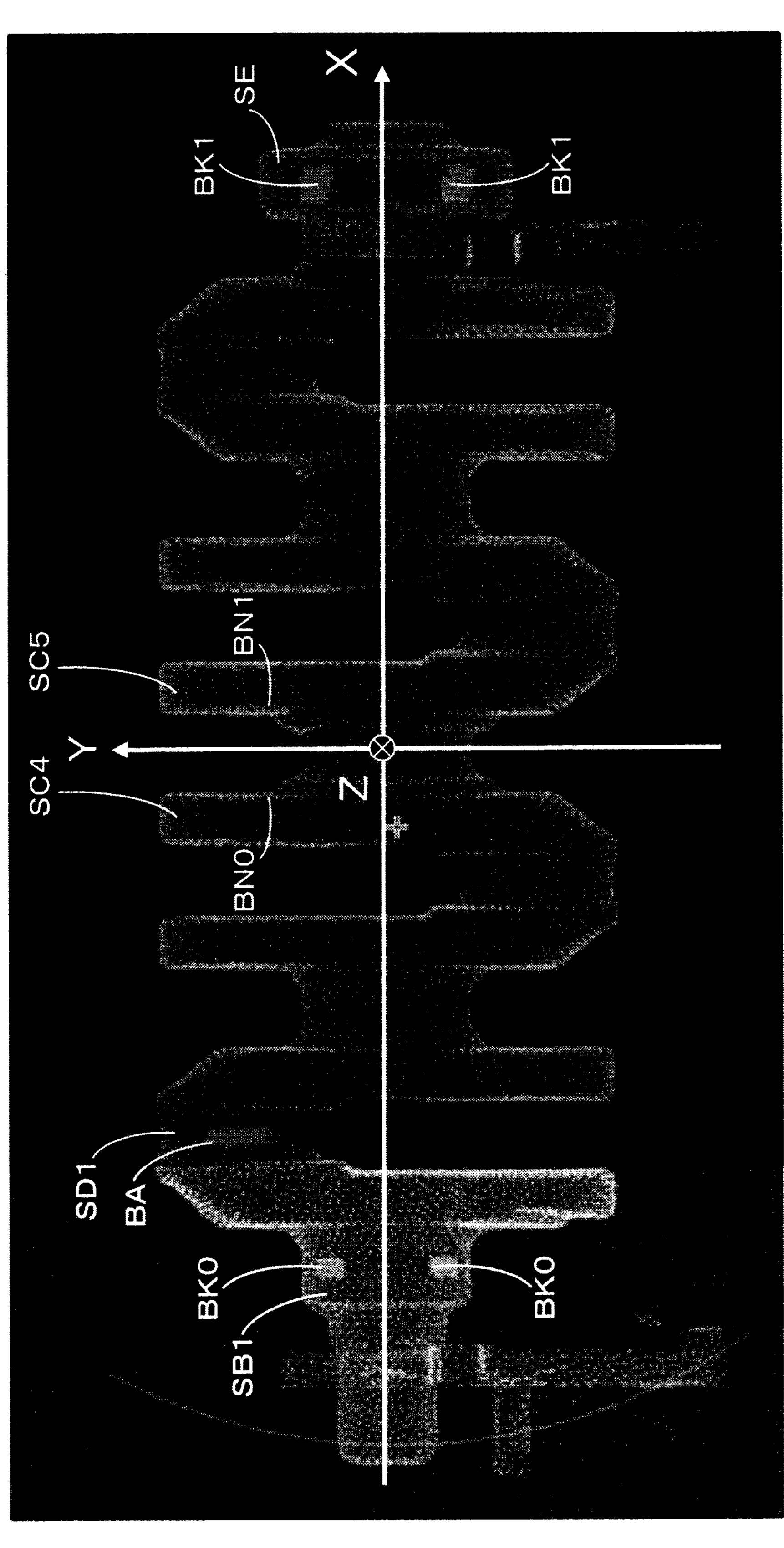
FIG. 8 is an explanatory view explaining the third step of the crankshaft shape inspection method according to the embodiment.

FIG. 6A to FIG. 8 are explanatory views explaining the third step. FIG. 6A is a front view of the crankshaft S viewed from the direction of the rotation center axis L when the crankshaft S is not bent or twisted, and FIG. 6B is a side view of the crankshaft S viewed from the direction orthogonal to the rotation center axis L, which corresponds to FIG. 6A. FIG. 7A is a front view of the crankshaft S viewed from the direction of the rotation center axis L when the crankshaft S is bent or twisted, and FIG. 7B is a side view of the crankshaft S viewed from the direction orthogonal to the rotation center axis L, which corresponds to FIG. 7A. FIG. 8 is a view illustrating one example of the three-dimensional point cloud data of the crankshaft S viewed from the direction orthogonal to the rotation center axis L.

As illustrated in FIG. 6A to FIG. 8, in this embodiment, as the machining reference portion, of the crankshaft S, two shaft portions (specifically, a first journal SB1 and the flange SE), one pin (specifically, a first pin SD1), and two adjacent counterweights (specifically, a fourth counterweight SC4 and a fifth counterweight SC5) are set. Further, as the machining reference, centers $P_{K0}$ and $PK_1$, of the respective two shaft portions (the first journal SB1 and the flange SE), a center $P_A$ of the pin (the first pin SD1), and facing side surfaces $P_{NO}$ and $P_{N1}$ of the two counterweights (the fourth counterweight SC4 and the fifth counterweight SC5) (side surfaces facing in the direction of the rotation center axis of the crankshaft S) are set.

Specifically, at the third step, the moving unit 23 extracts, as the machining reference portion point cloud data for the two shaft portions (the first journal SB1 and the flange SE) of the crankshaft S, which are the machining reference portions, point cloud data BK0 and BK1 of the portions that fixing chucks (specifically, centering chucks not illustrated) for fixing the crankshaft S come into contact with. The point cloud data BK0 are pieces of point cloud data at four portions, in the circumferential direction, of the first journal SB1 that jaws of the fixing chuck come into contact with, and the positions can be recognized from the surface shape model superposed on the three-dimensional point cloud data. Similarly, the point cloud data BK1 are pieces of point cloud data at four portions, in the circumferential direction, of the flange SE that jaws of the fixing chuck come into contact with, and the positions can be recognized from the surface shape model superposed on the three-dimensional point cloud data. In practice, the ranges of the point cloud data BK0 and BK1 each are set slightly larger to include the vicinity of the position recognized from the surface shape model. By setting the range to be slightly larger, it is possible to improve the calculation accuracy of the center of a cylinder in fitting processing to be described later.

Then, the moving unit 23 performs fitting processing for fitting a cylinder on each of four pieces of the extracted point cloud data BK0 and four pieces of the extracted point cloud data BK1, calculates the center of the fitted cylinder, and sets this calculated center to the center $P_{K0}$ and $P_{K1}$ of the two shaft portions (the first journal SB1 and the flange SE), which are the machining reference. The moving unit 23 translates and rotates the three-dimensional point cloud data to make the coordinates of the machining references $P_{K0}$ and $P_{K1}$ match with the predetermined coordinates in the coordinate system (XYZ coordinate system in FIG. 6A to FIG. 8) used when the crankshaft S is machined. Specifically, when the coordinates of the machining references PRO and $P_{K1}$ in the coordinate system used when the crankshaft S is machined are set to $P_{K0}(x_{k0}, y_{k0}, z_{k0})$ and $P_{K1}(x_{k1}, y_{k1}, z_{k1})$ respectively, the amount of translation in the Y-axis direction is set to $y_T$, the rotation angle around the Y axis is set to $y_R$ [rad], the amount of translation in the Z-axis direction is set to $z_T$, and the rotation angle around the Z axis is set to $z_R$ [rad], the moving unit 23 translates and rotates the three-dimensional point cloud data according to Equations (1) to (4) below so that the machining references $P_{K0}$ and $P_{K1}$ are located on the X axis.

$$y_T=(x_{K0}\cdot y_{K1}-y_{K0}\cdot x_{K1})/(x_{K0}-x_{K1}) \tag{1}$$

$$z_T=(x_{K0}\cdot z_{K1}-y_{K0}\cdot x_{K1})/(x_{K0}-x_{K1}) \tag{2}$$

$$y_R = -180/\pi \cdot \tan^{-1}((z_{K1}-z_{K0})/(x_{K1}-x_{K0})) \quad (3)$$

$$z_R = 180/\pi \cdot \tan^{-1}((y_{K1}-y_{K0})/(x_{K1}-x_{K0})) \quad (4)$$

Further, at the third step, the moving unit 23 extracts, as the machining reference portion point cloud data for the single pin (the first pin SD1) of the crankshaft S, which is the machining reference portion, point cloud data BA of the portion that a fixing chuck (specifically, a phase clamp not illustrated) for fixing the crankshaft S comes into contact with. The point cloud data BA are pieces of point cloud data at two portions, in the circumferential direction, of the first pin SD1 that jaws of the fixing chuck come into contact with, and the positions can be recognized from the surface shape model superposed on the three-dimensional point cloud data. In practice, the range of the point cloud data BA is set slightly larger to include the vicinity of the position recognized from the surface shape model. By setting the range to be slightly larger, the center of the first pin SD1 can be calculated with high accuracy even if the actual angle or position of the first pin SD1 deviates and thereby the actual contact position of the fixing chuck deviates from the designed position.

Then, the moving unit 23 calculates intermediate coordinates $z_A$ between the largest Z-axis coordinates and the smallest Z-axis coordinates of two pieces of the extracted point cloud data BA to find the center $P_A(x_A, y_A, z_A)$ of the single pin (the first pin SD1) that is the machining reference. Here, $x_A$ and $y_A$ are the X-axis coordinates to be the center in the X-axis direction and the Y-axis coordinates to be the center in the Y-axis direction, respectively, in the shape of the first pin SD1 determined by the design specifications. The moving unit 23 rotates the three-dimensional point cloud data to make the coordinates of the machining reference $P_A$ match with the predetermined coordinates in the coordinate system (XYZ coordinate system in FIG. 6A to FIG. 8) used when the crankshaft S is machined. Specifically, when the coordinates of the machining reference $P_A$ in the coordinate system used when the crankshaft S is machined are set to $P_A(x_A, y_A, z_A)$ and the rotation angle around the X axis is set to $X_R$ [rad], the moving unit 23 rotates the three-dimensional point cloud data according to Equation (5) below so that the machining reference $P_A$ is located within the XY plane.

$$x_R = 180/\pi \cdot \tan^{-1}(z_A/y_A) \quad (5)$$

Further, at the third step, the moving unit 23 extracts, as the machining reference portion point cloud data for the two adjacent counterweights (the fourth counterweight SC4 and the fifth counterweight SC5) of the crankshaft S, which are the machining reference portions, point cloud data BN0 and BN1 at two portions of the facing side surfaces. The positions of the point cloud data BN0 and BN1 can be recognized from the surface shape model superposed on the three-dimensional point cloud data. In practice, the range of the point cloud data BN0 and BN1 is set slightly larger to include the vicinity of the position recognized from the surface shape model. By setting the range to be slightly larger, even if the longitudinal position of the counterweight SC deviates, the longitudinal position can be calculated as long as it is within the set range.

Then, the moving unit 23 calculates the average value of the X-axis coordinates for each of two pieces of the extracted point cloud data BN0 and BN1, and the points with these calculated X-axis coordinates are set to the facing side surfaces $P_{N0}$ and $P_{N1}$ of the two counterweights that are the machining references. The moving unit 23 translates the three-dimensional point cloud data to make the coordinates of the machining references $P_{N0}$ and $P_{N1}$ match with the predetermined coordinates in the coordinate system (XYZ coordinate system in FIG. 6A to FIG. 8) used when the crankshaft S is machined. Specifically, when the X-axis coordinates of the machining references $P_{N0}$ and $P_{N1}$ in the coordinate system used when the crankshaft S is machined are set to $x_{N0}$ and $x_{N1}$ respectively and the amount of translation in the X-axis direction is set to $x_T$, the moving unit 23 translates the three-dimensional point cloud data according to Equation (6) below so that the machining references $P_{N0}$ and $P_{N1}$ are located within the YZ plane.

$$x_T = -(x_{N0}+x_{N1})/2 \quad (6)$$

As illustrated in FIG. 6A and FIG. 6B, when the crankshaft S is not bent or twisted, even if the third step is executed, the three-dimensional point cloud data are not translated or rotated, or the amount of movement is slight. In contrast to this, as illustrated in FIG. 7A and FIG. 7B, when the crankshaft S is bent or twisted, by executing the third step, the three-dimensional point cloud data are translated and rotated to make the dashed line illustrated near the Y axis in FIG. 7A (the straight line passing through the machining references $P_{K0}$ and $P_A$ viewed from the X-axis direction) match with the Y axis, and make the dashed line illustrated near the X axis in FIG. 7B (the rotation center axis L of the crankshaft S passing through the machining references $P_{K0}$ and $P_{K1}$ viewed from the Z-axis direction) match with the X axis.

As above, by executing the third step, from the three-dimensional point cloud data, the machining reference portion point cloud data, which are the point cloud data of the predetermined machining reference portions (such as the two shaft portions of the crankshaft S), are extracted. The position of the machining reference portion point cloud data can be recognized from the surface shape model, and the positions of the machining reference portion point cloud data in the three-dimensional point cloud data can also be recognized because the three-dimensional point cloud data are superposed on the surface shape model at the second step. Therefore, the machining reference portion point cloud data can be extracted from the three-dimensional point cloud data.

Then, by executing the third step, the three-dimensional point cloud data are translated and rotated to make the coordinates of the machining references (such as the centers of the two shaft portions of the crankshaft S) determined by the extracted machining reference portion point cloud data match with the coordinates predetermined in the coordinate system used when the crankshaft S is machined. This allows the three-dimensional point cloud data of the crankshaft S to be represented in the coordinate system used when the crankshaft S is machined, in other words, the state of the crankshaft S at the time of machining can be reproduced.

<Fourth Step (Generation Step)>

Figure 9A:
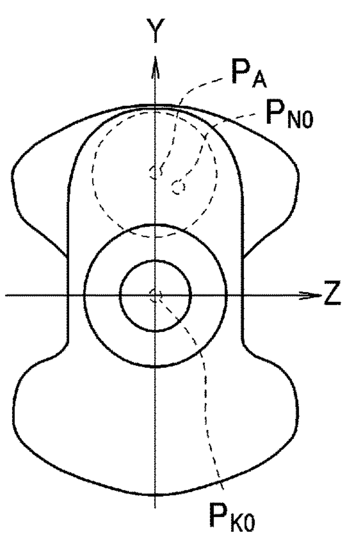
FIG. 9A is an explanatory view explaining a fourth step and a fifth step of the crankshaft shape inspection method according to the embodiment.
Figure 9B:
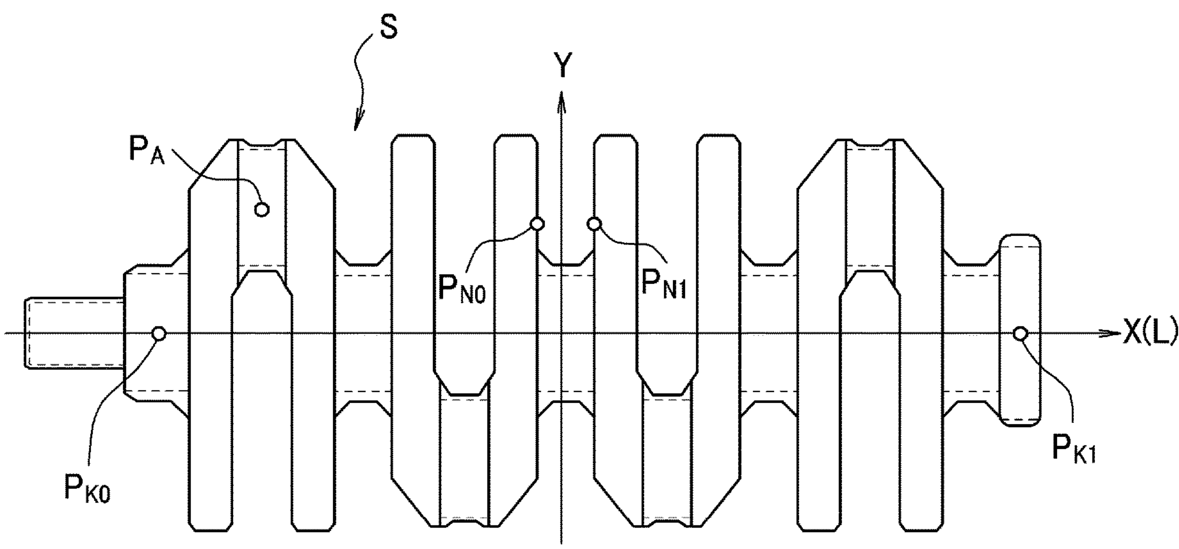
FIG. 9B is an explanatory view explaining the fourth step and the fifth step of the crankshaft shape inspection method according to the embodiment.
Figure 10A:
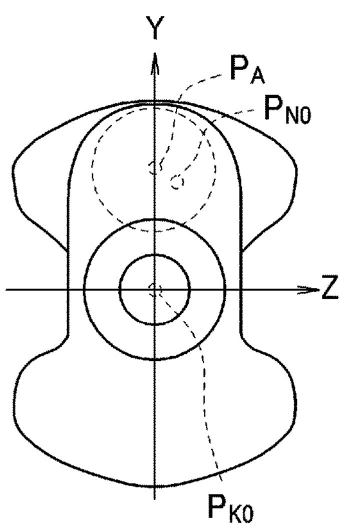
FIG. 10A is an explanatory view explaining the fourth step and the fifth step of the crankshaft shape inspection method according to the embodiment.
Figure 10B:
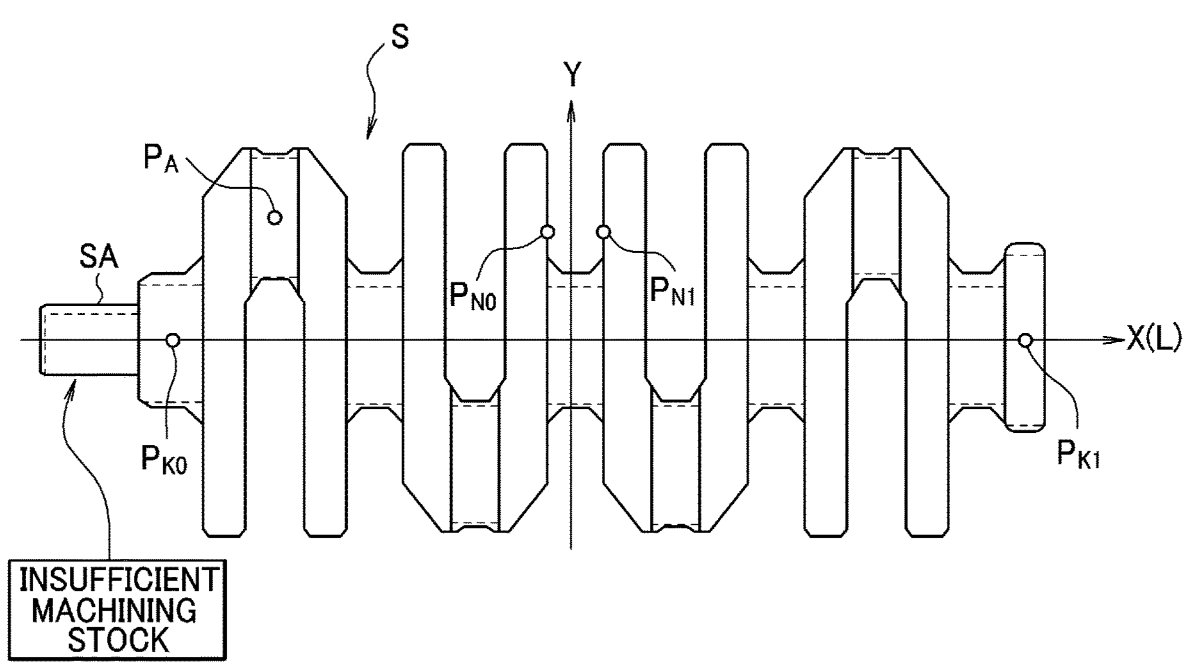
FIG. 10B is an explanatory view explaining the fourth step and the fifth step of the crankshaft shape inspection method according to the embodiment.

FIG. 9A, FIG. 9B, FIG. 10A, and FIG. 10B are explanatory views explaining the fourth step and the fifth step. FIG. 9A and FIG. 9B are views corresponding to the crankshaft S illustrated in FIG. 6A and FIG. 6B. That is, FIG. 9A is a front view of the crankshaft S viewed from the direction of the rotation center axis L when the crankshaft S is not bent or twisted, and FIG. 9B is a side view of the crankshaft S viewed from the direction orthogonal to the rotation center axis L, which corresponds to FIG. 9A. FIG. 10A and FIG. 10B are views corresponding to the crankshaft S illustrated in FIG. 7A and FIG. 7B. That is, FIG. 10A is a front view of the crankshaft S viewed from the direction of the rotation center axis L when the crankshaft S is bent or twisted, and FIG. 10B is a side view of the crankshaft S viewed from the direction orthogonal to the rotation center axis L, which corresponds to FIG. 10A.

At the fourth step, the generation unit 24 in the arithmetic unit 2 generates an estimated machined surface, which is the surface after machining of a predetermined machining portion of the crankshaft S, in the coordinate system (XYZ coordinate system in FIG. 9A to FIG. 10B) used when the crankshaft S is machined. The generation unit 24 virtually generates an estimated machined surface based on machining information such as machining drawings prepared in advance, for example, by a three-dimensional surface generation function of a three-dimensional analysis library. A cylinder is preferably set as the estimated machined surface. In this embodiment, the front SA, the journal SB, the flange SE, which are the shaft portion of the crankshaft S, and the pin SD of the crankshaft S are set as the machining portion, and a cylinder having a radius and an axial machining length after machining is generated based on the machining information. In FIG. 9B and FIG. 10B, the estimated machined surface is illustrated by a dashed line.

<Fifth Step (Determination Step)>

At the fifth step, the determination unit 25 in the arithmetic unit 2 extracts machining portion point cloud data, which are point cloud data of the machining portions (the front SA, the journal SB, the flange SE, and the pin SD) from the three-dimensional point cloud data (see FIG. 9A to FIG. 10B) moved at the third step. The position of the machining portion point cloud data can be recognized in the coordinate system at the time of machining, and by executing the third step, the three-dimensional point cloud data are represented in the coordinate system used when the crankshaft S is machined. Therefore, the position of the machining portion point cloud data in the three-dimensional point cloud data can also be recognized, and the machining portion point cloud data can be extracted from the three-dimensional point cloud data.

Then, at the fifth step, the determination unit 25 calculates the distance between the extracted machining portion point cloud data and the estimated machined surface (cylinder) generated at the fourth step, and determines the machining stock required for machining of the crankshaft S to be insufficient based on the calculated distance. For example, when the crankshaft is designed to have a machining stock of 2 mm, the minimum required machining stock is set to 0.8 mm, and when there is a distance that is less than the minimum required machining stock among the calculated distances, it is conceivable to determine that the machining stock of the crankshaft S is insufficient. In the example illustrated in FIG. 10A and FIG. 10B, the distance between the machining portion point cloud data of the front SA and the estimated machined surface of the front SA indicated by the dashed line is small, and thus the machining stock is determined to be insufficient.

Further, the determination unit 25 may calculate the proportion of point cloud data whose distance to the calculated estimated machined surface is less than the minimum required machining stock to the machining portion point cloud data, and may determine that the machining stock of the crankshaft S is insufficient when the calculated proportion of the point cloud data is equal to or more than a predetermined threshold value.

Table 1 below illustrates one example of the results obtained by calculating the above proportion for the crankshafts S illustrated in FIG. 9A to FIG. 10B. In the case of the good crankshaft S illustrated in FIG. 9A and FIG. 9B, the proportion of the point cloud data whose distance D to the calculated estimated machined surface is less than the minimum required machining stock of 0.8 mm is 0.00%. In contrast to this, in the case of the defective crankshaft S illustrated in FIG. 10A and FIG. 10B, the proportion of the point cloud data whose distance D to the calculated estimated machined surface is less than the minimum required machining stock of 0.8 mm is 1.09% (=0.69%+0.40%). For example, when the threshold value is set to 1%, it is determined that the machining stock is sufficient in the case of the good crankshaft S illustrated in FIG. 9A and FIG. 9B, and the machining stock is insufficient in the case of the defective crankshaft illustrated in FIG. 10A and FIG. 10B.

TABLE 1

| DISTANCE D TO ESTIMATED MACHINED SURFACE | GOOD CRANKSHAFT (FIG. 9A, FIG. 9B) | DEFECTIVE CRANKSHAFT (FIG. 10A, FIG. 10B) |
|---|---|---|
| D ≤ 0 mm | 0.00% | 0.69% |
| 0 < D < 0.8 mm | 0.00% | 0.40% |
| 0.8 mm ≤ D | 100.00% | 98.91% |

The arithmetic unit 2 includes a monitor, where the machining portion point cloud data extracted and the distances calculated at the fifth step are displayed.

FIG. 11 is a view illustrating a display example of the monitor included in the arithmetic unit 2. The machining portion point cloud data to be displayed on the monitor are designed to be displayed in different colors according to the size of the calculated distance. In FIG. 11, part of the machining portion point cloud data of the front SA is actually displayed in red, indicating that the distance is less than the minimum required machining stock of 0.8 mm. By just visually recognizing such a display, an operator can easily confirm whether or not the machining stock is insufficient.

As at the fifth step, according to the configuration of calculating the distance between the extracted machining portion point cloud data (each data point constituting the point cloud data) and the estimated machined surface (cylinder), for example, compared to the configuration of fitting a cylinder to the extracted machining portion point cloud data and calculating the distance between the fitted cylinder and the estimated machined surface, it is possible to more accurately determine the machining stock of the crankshaft S to be insufficient. That is, as can be seen from FIG. 9A, FIG. 9B, FIG. 10A, and FIG. 10B, the outer edge of the machining portion (for example, the pin) is not a perfect cylinder and may be curved in a concave shape, or the like, and thus, the configuration that calculates the distance between the cylinder fitted to the machining portion point cloud data and the estimated machined surface does not accurately reflect the shape of the curved machining portion in the machining stock. In contrast to this, in this embodiment, since the distance between each data point constituting the point cloud data and the estimated machined surface is calculated, the shape of the curved machining portion is accurately reflected in the machining stock.

Hereinbefore, the present invention has been described with an embodiment, but the above-described embodiment merely illustrates concrete examples of implementing the present invention, and the technical scope of the present invention is not to be construed in a restrictive manner by these embodiments. That is, the present invention may be implemented in various forms without departing from the technical spirit or main feature thereof.

The invention claimed is:

1. A crankshaft shape inspection method, comprising:

acquiring three-dimensional point cloud data of a surface of a crankshaft by a three-dimensional shape measuring device measuring a surface shape of the crankshaft;

superposing the three-dimensional point cloud data on a surface shape model of the crankshaft prepared in advance based on design specifications of the crankshaft;

moving the three-dimensional point cloud data superposed on the surface shape model to match with a coordinate system used when the crankshaft is machined;

generating an estimated machined surface, which is the surface after machining of a predetermined machining portion of the crankshaft, in the coordinate system used when the crankshaft is machined; and extracting from the three-dimensional point cloud data that was moved to match with the coordinate system used when the crankshaft is machined, machining portion point cloud data, which are point cloud data of the machining portion, calculating a distance between the extracted machining portion point cloud data and the estimated machined surface, and determining a machining stock of the crankshaft to be insufficient based on the calculated distance, wherein superposing the three-dimensional point cloud data on the surface shape model of the crankshaft comprise, the three-dimensional point cloud data are translated and rotated to make a distance between the three-dimensional point cloud data and the surface shape model minimum, and are superposed on the surface shape model, and moving the three-dimensional point cloud data comprise, from the three-dimensional point cloud data superposed on the surface shape model, machining reference portion point cloud data, which are point cloud data of a predetermined machining reference portion, are extracted, and the three-dimensional point cloud data are translated and rotated to make coordinates of a machining reference determined by the extracted machining reference portion point cloud data match with coordinates predetermined in the coordinate system used when the crankshaft is machined, and wherein moving the three-dimensional point cloud data comprise, the machining reference portion is two shaft portions, a single pin, and two adjacent counterweights of the crankshaft, and the machining reference is a center of each of the two shaft portions, a center of the single pin, and facing side surfaces of the two counterweights.

2. The crankshaft shape inspection method according to claim 1, wherein generating an estimated machined surface comprise, the machining portion is a shaft portion and a pin of the crankshaft, and the estimated machined surface is a cylinder.

3. The crankshaft shape inspection method according to claim 1, wherein moving the three-dimensional point cloud data comprise, regarding the two shaft portions and the single pin among the machining reference portions, as machining reference portion point cloud data, point cloud data of a portion that a fixing chuck for fixing the crankshaft comes into contact with are extracted.

4. The crankshaft shape inspection method according to claim 1, wherein determining the machining stock of the crankshaft to be insufficient comprise, a proportion of point cloud data whose distance to the calculated estimated machined surface is less than a predetermined minimum required machining stock to the machining portion point cloud data is calculated, and when the calculated proportion of the point cloud data is equal to or more than a predetermined threshold value, the machining stock of the crankshaft is determined to be insufficient.

5. The crankshaft shape inspection method according to claim 1, wherein the three-dimensional shape measuring device is a plurality of optical three-dimensional shape measuring devices that are arranged around a rotation center axis of the crankshaft, and measure a three-dimensional shape of the crankshaft by projecting and receiving light on and from the crankshaft while relatively moving in a direction parallel to the rotation center axis of the crankshaft.

6. An arithmetic unit intended for inspecting a shape of a crankshaft, the arithmetic unit comprising:

a computer processor including processing circuitry programmed to perform operations comprising:

acquire three-dimensional point cloud data of a surface of the crankshaft based on a result obtained by a three-dimensional shape measuring device measuring a surface shape of the crankshaft;

superpose the three-dimensional point cloud data on a surface shape model of the crankshaft prepared in advance based on design specifications of the crankshaft;

move the three-dimensional point cloud data superposed on the surface shape model to match with a coordinate system used when the crankshaft is machined;

generate an estimated machined surface, which is the surface after machining of a predetermined machining portion of the crankshaft, in the coordinate system used when the crankshaft is machined; and extract from the three-dimensional point cloud data that was moved to match with the coordinate system used when the crankshaft is machined, machining portion point cloud data, which are point cloud data of the machining portion, calculate a distance between the extracted machining portion point cloud data and the estimated machined surface, and determine a machining stock of the crankshaft to be insufficient based on the calculated distance, wherein superposing the three-dimensional point cloud data on the surface shape model of the crankshaft comprise, the three-dimensional point cloud data are translated and rotated to make a distance between the three-dimensional point cloud data and the surface shape model minimum, and are superposed on the surface shape model, and moving the three-dimensional point cloud data comprise, from the three-dimensional point cloud data superposed on the surface shape model, machining reference portion point cloud data, which are point cloud data of a predetermined machining reference portion, are extracted, and the three-dimensional point cloud data are translated and rotated to make coordinates of a machining reference determined by the extracted machining reference portion point cloud data match with coordinates predetermined in the coordinate system used when the crankshaft is machined, and wherein moving the three-dimensional point cloud data comprise, the machining reference portion is two shaft portions, a single pin, and two adjacent counterweights of the crankshaft, and the machining reference is a center of each of the two shaft portions, a center of the single pin, and facing side surfaces of the two counterweights.

7. A crankshaft shape inspection apparatus, comprising:

four or more optical three-dimensional shape measuring devices that are arranged around a rotation center axis of a crankshaft, and measure a three-dimensional shape of the crankshaft by projecting and receiving light on and from the crankshaft while relatively moving in a direction parallel to the rotation center axis of the crankshaft; and an arithmetic unit that receives measurement results obtained by the four or more three-dimensional shape measuring devices and executes a predetermined arithmetic operation, wherein the three-dimensional shape measuring devices are divided into first-group shape measuring devices and second-group shape measuring devices, the first-group shape measuring devices that have light projection directions thereof inclined in the same direction with respect to a direction orthogonal to the rotation center axis of the crankshaft and the second-group shape measuring devices that have light projection directions thereof inclined in a direction different from the direction of the first-group shape measuring devices, the second-group shape measuring devices are arranged around the rotation center axis of the crankshaft between the first-group shape measuring devices, and in the arithmetic unit, a surface shape model of the crankshaft, which is created based on design specifications of the crankshaft, is stored in advance, the arithmetic unit includes:

a computer processor including processing circuitry programmed to perform operations comprising:

acquire three-dimensional point cloud data of a surface of the crankshaft based on results obtained by the three-dimensional shape measuring devices measuring a surface shape of the crankshaft;

superpose the three-dimensional point cloud data on the surface shape model;

move the three-dimensional point cloud data superposed on the surface shape model to match with a coordinate system used when the crankshaft is machined;

generate an estimated machined surface, which is the surface after machining of a predetermined machining portion of the crankshaft, in the coordinate system used when the crankshaft is machined; and extract from the three-dimensional point cloud data that was moved to match with the coordinate system used when the crankshaft is machined, machining portion point cloud data, which are point cloud data of the machining portion, calculate a distance between the extracted machining portion point cloud data and the estimated machined surface, and determine a machining stock of the crankshaft to be insufficient based on the calculated distance, wherein superposing the three-dimensional point cloud data on the surface shape model of the crankshaft comprise, the three-dimensional point cloud data are translated and rotated to make a distance between the three-dimensional point cloud data and the surface shape model minimum, and are superposed on the surface shape model, and moving the three-dimensional point cloud data comprise, from the three-dimensional point cloud data superposed on the surface shape model, machining reference portion point cloud data, which are point cloud data of a predetermined machining reference portion, are extracted, and the three-dimensional point cloud data are translated and rotated to make coordinates of a machining reference determined by the extracted machining reference portion point cloud data match with coordinates predetermined in the coordinate system used when the crankshaft is machined, and wherein moving the three-dimensional point cloud data comprise, the machining reference portion is two shaft portions, a single pin, and two adjacent counterweights of the crankshaft, and the machining reference is a center of each of the two shaft portions, a center of the single pin, and facing side surfaces of the two counterweights.

* * * * *